United States Patent
Utsumi et al.

(10) Patent No.: US 8,279,726 B2
(45) Date of Patent: Oct. 2, 2012

(54) RECORDING DEVICE FOR RECORDING A CONTENT INTO A PLURALITY OF RECORDING MEDIA AND CONTROL METHOD THEREOF

(75) Inventors: Okihisa Utsumi, Osaka (JP); Shohji Ohtsubo, Osaka (JP); Masahiro Muikaichi, Osaka (JP)

(73) Assignee: Panasonic Corporation, Osaka (JP)

( * ) Notice: Subject to any disclaimer, the term of this patent is extended or adjusted under 35 U.S.C. 154(b) by 721 days.

(21) Appl. No.: 12/096,882

(22) PCT Filed: Dec. 20, 2006

(86) PCT No.: PCT/JP2006/325339
§ 371 (c)(1),
(2), (4) Date: Jun. 10, 2008

(87) PCT Pub. No.: WO2007/072843
PCT Pub. Date: Jun. 28, 2007

(65) Prior Publication Data
US 2009/0245046 A1 Oct. 1, 2009

(30) Foreign Application Priority Data
Dec. 20, 2005 (JP) ................. 2005-366058

(51) Int. Cl.
*G11B 5/09* (2006.01)
*G11B 27/36* (2006.01)
*G11B 21/08* (2006.01)

(52) U.S. Cl. ............... 369/47.12; 369/47.15; 369/30.05; 369/30.19; 369/53.24

(58) Field of Classification Search ............... 369/30.05, 369/30.19, 47.12, 84.85, 47.15, 53.24
See application file for complete search history.

(56) References Cited

U.S. PATENT DOCUMENTS
6,421,750 B1 * 7/2002 Gunther et al. ................. 710/72
(Continued)

FOREIGN PATENT DOCUMENTS
JP 9-198845 7/1997
(Continued)

OTHER PUBLICATIONS
International Search Report issued Apr. 10, 2007 in the International (PCT) Application of which the present application is the U.S. National Stage.

*Primary Examiner* — Aneeta Yodichkas
(74) *Attorney, Agent, or Firm* — Wenderoth, Lind & Ponack, L.L.P.

(57) ABSTRACT

A recording device records contents in a plurality of recording media. While the recording device records a content in a recording medium, if a free space of the recording medium runs out, an unrecorded part of the content needs to be recorded in another recording medium. In order to play back all parts of the content, all recording media in which all the parts of the content have been separately recorded are necessary. Particularly, if an internal recording medium included in the recording device has a small space and accordingly a sufficient space is secured by connecting an external removable recording medium to the recording device after the recording has started, parts of the content are separately recorded in the internal recording medium and the external recording medium. As a result, even if the external recording medium is removed from the recording device and is connected to a playback device in order to play back all the parts of the content, it is possible to play back only one part of the content. In order to play back all parts of the content using another playback device, a user needs to edit the separately recorded parts of the content so as to be saved in a single recording medium. In view of this problem, the present invention aims to provide a recording device that controls a recording destination of a content to be recorded such that the content can be recorded in a single recording medium for as long as possible.

15 Claims, 6 Drawing Sheets

U.S. PATENT DOCUMENTS

| | | | |
|---|---|---|---|
| 7,146,522 B1 * | 12/2006 | Rowe et al. | 714/6 |
| 2006/0013093 A1 * | 1/2006 | Tatsuda | 369/53.1 |
| 2006/0153033 A1 * | 7/2006 | Saito et al. | 369/47.33 |
| 2007/0070828 A1 * | 3/2007 | Watanabe et al. | 369/30.19 |

FOREIGN PATENT DOCUMENTS

| | | |
|---|---|---|
| JP | 2004-295975 | 10/2004 |
| JP | 2004-303368 | 10/2004 |
| JP | 2005-268839 | 9/2005 |

* cited by examiner

RECORDING DEVICE FOR RECORDING A CONTENT INTO A PLURALITY OF RECORDING MEDIA AND CONTROL METHOD THEREOF

TECHNICAL FIELD

The present invention relates to control of recording media performed by a recording device for recording contents.

BACKGROUND ART

In recent years, there have been developed and widely used recording devices that record contents such as video and audio information in recording media, which include disk media such as DVDs and hard disks, and semiconductor memories having a large storage space.

As measures against the case that there is insufficient free space on a recording medium in which a content is being recorded, such a recording device uses a method for displaying an error message or a method for deleting unnecessary contents, for example.

According to the method for displaying an error message, when a free space of a recording medium is insufficient, the recording device displays an error message representing that the free space is insufficient to a user. The recording device can continue to record the content by the user preparing an additional recording space. For example, the user may replace the recording medium that does not have a sufficient free space with another recording medium having a sufficient free space. Alternatively, the user may delete any of contents that have ever been recorded in the recording medium that does not have the sufficient space. However, according to this method, the user has to interrupt recording of the content while the user replaces the recording medium or deletes any of the recorded contents. Therefore, it is impossible to record all parts of the content.

The Patent Document 1 discloses a method for securing a free space in case of free space insufficiency. When a size of a free space of a recording medium in which a content is being recorded is no more than a predetermined size, a recording device automatically deletes any predetermined content among contents that have ever been recorded in the recording medium to secure a free space. There are various methods for automatically deleting the predetermined content. For example, a method for deleting an old content among recorded contents and a method for deleting a beginning part and an end part of any of the recorded contents are used. However, according to these methods, a content that the user does not hope to delete might be deleted from the recording medium.

Patent Document 1: Japanese Patent Application Publication No. 2004-303368

SUMMARY OF THE INVENTION

Problems the Invention is Going to Solve

By the way, there are two modes for recording contents. One is a timer recording mode used in a case where a recording time period of a content to be recorded is known beforehand. The other is a real-time recording mode used in a case where recording of a content starts in accordance with pressing of a recording button by a user, and the recording stops in accordance with pressing of a stop button by the user. According to the real-time recording mode, it is unknown what time recording of the content ends. Therefore, if a content is recorded in a removable recording medium that does not have a sufficient space, there is a possibility that it is impossible to record an end part of the content in the removable recording medium.

In order to avoid such a possibility, it is desirable to prepare a drive for a substitute recording medium before the space of the removable recording medium runs out, and change a recording destination of the content from the removable recording medium to the substitute recording medium when the space of the removable recording medium runs out. However, if the recording destination is changed when the space of the removable recording medium runs out, the content will be recorded in different recording media before and after the change of the recording destination. It is difficult to treat such a content recorded in parts in a plurality of recording media, and this inconveniences the user.

Accordingly, it is desirable to prepare a recording medium having a sufficient space before a timer recording of a content starts. However, it often happens that a user fails to record all the content because although broadcast of a content that the user hopes to record has already started, the user has not yet prepared a recording medium having a sufficient space necessary for recording all the content.

If a DVD recorder including therein an internal hard disk having a large space is used as a recording device for recording a content, such a hard disk mostly has a space which is sufficient for recording all the content, for example a space of 500 GB. Accordingly, the problem in which an end part of the content cannot be recorded as described above does not occur frequently. However, low-cost DVD recorders do not include therein an internal hard disk, and a recording destination is only a DVD that does not have a sufficient space. Accordingly, the above problem occurs frequently.

The present invention aims to provide a recording device capable of recording all parts of a content in a recording medium, even when a substitute recording medium having a sufficient space cannot be prepared before real-time recording of the content starts.

Means to Solve the Problems

In order to solve the above problem, the recording device according to the present invention is a recording device that records contents in recording media, the recording device comprises: a search unit operable, in a state where only a part of a content has been recorded in a recording medium, to search for an other recording medium that satisfies a predetermined condition; a change unit operable to change a recording destination of an unrecorded part of the content to the recording medium found by the search unit; and a transferring unit operable to transfer the recorded part to the found recording medium.

Effect of the Invention

While a content is recorded in a recording medium, if a drive for a substitute recording medium having a sufficient free space is prepared, the substitute recording medium is connected to the recording device and then a recording destination of the content is changed to the substitute recording medium.

Also, a recorded part of a content that has already been recorded in the recording medium is transferred to the substitute recording medium, and a part of the content that has not yet been recorded in the recording medium is subsequently recorded in the substitute recording medium. Accordingly, there is a high possibility that all parts of one content can be saved in a single recording medium.

Even if a drive for a substitute recording medium cannot be prepared before recording of a content starts, it is possible to record all parts of the content in a drive for a single recording medium. Accordingly, it is possible to conveniently use the recorded content at a later date.

Particularly, if a DVD recorder that does not include therein an internal hard disk is used as a recording device for recording a content, by connecting a drive having a larger space to the recording device afterward via a USB connector or a home network, it is possible to prevent missing of an end part of the content and recording of parts of the content separately in a plurality of recording media due to space insufficiency of the DVD. Therefore, it is possible to exhibit effects of the present invention by adopting the recording device of the present invention to DVD recorders that does not include therein an internal hard disk.

Here, the recording medium that satisfies the predetermined condition may have a free space whose size is larger than a sum of a size of a free space of the recording medium in which the content is being recorded and a size of the recorded part of the content.

As a new recording destination of a content being recorded, a recording medium is selected that has a free space whose size is larger than a sum of a size of a free space of a recording medium in which the content is being recorded and a size of a part of the content that has already been recorded in the recording medium. Accordingly, it is possible to record the content in a single recording medium for as long as possible.

Here, if the search unit finds a plurality of recording media that each satisfies the predetermined condition, the change unit may change the recording destination to a recording medium having a free space whose size is largest among the found recording media.

Among recording media each having a free space whose size is larger than a size of a free space of a recording medium in which a content is being recorded, a recording medium having a free space whose size is largest is selected as a new recording destination of the content. Accordingly, there is a higher possibility that all parts of the content can be recorded in a single recording medium.

Here, the content may have a fixed time length, a total of a size of a free space required for recording the unrecorded part of the content and the size of the recorded part of the content may be calculated based on the fixed time length, and the recording medium that satisfies the predetermined condition may have a free space whose size is larger than the total.

Among recording media each having a free space whose size is larger than a sum of a size of a free space required for recording an unrecorded part of a content being recorded and a size of a recorded part of the content, a recording medium having a free space whose size is largest is selected as a new recording destination of the content. Accordingly, it is possible to record the content in a single recording medium for as long as possible.

Here, if the search unit finds a plurality of recording media that each satisfies the predetermined condition, the change unit may change the recording destination to a recording medium having a free space whose size is smallest among the found recording media.

Among recording media each having a free space required for recording all parts of a content being recorded, a recording medium having a free space whose size is smallest is selected as a new recording destination of the content. Accordingly, it is possible to efficiently use free spaces of the recording media.

Here, the search unit may perform the searching by detecting, at a predetermined time interval, the size of the free space of the recording medium in which the content is being recorded and a size of a free space of each of recording media accessible to the recording device, and may perform comparison using the sizes.

While a content is recorded, search for a substitute recording medium is repeatedly performed at predetermined time intervals. Accordingly, if a drive for a new recording medium is connected to the recording device while a content is recorded, the connected recording medium is detected in the predetermined time interval. Accordingly, it is possible to select the most advantageous recording medium as a new recording destination.

Here, the recording device may further comprise a judgment unit operable to judge whether a remaining recordable time period is shorter than a remaining recording time period required for recording the content, the remaining recordable time period being calculated based on the size of the free space of the recording medium in which the content is being recorded, and the remaining required recording time period being calculated based on a bit rate of the content, wherein when the judgment unit judges affirmatively, the change unit may change the recording destination.

When a remaining recordable time period of a recording medium in which a content is being recorded is shorter than a remaining time period required for recording the content, a recording destination of the content is changed to a substitute recording medium. Here, the remaining recordable time period is calculated based on a size of a free space of the recording medium in which the content is being recorded, and the remaining time period is calculated based on a bit rate of the content. As a result, it is possible to prevent missing of an end part of the content due to space insufficiency of the recording medium in which the content is being recorded. Also, when all parts of a content can be recorded in a single recording medium without changing a recording destination of the content to a substitute recording medium, it is possible to avoid careless use of a recording medium having a larger free space.

Here, the judgment unit may perform the judgment by judging whether the remaining recordable time period is shorter than the remaining required recording time period by no less than a time period required for the transfer unit to start transferring the recorded part.

When a remaining recordable time period of a recording medium in which a content is being recorded is shorter than a remaining time period required for recording the content by no less than a time period required for the transfer unit to start transferring a part of the content that has already been recorded, a recording destination of the content is changed to a substitute recording medium in which the content is being recorded. Here, the remaining recordable time period is calculated based on a size of a free space of the recording medium, and the remaining time period is calculated based on a bit rate of the content. As a result, it is possible to prevent missing of an end part of the content due to a time period required for making the substitute recording medium accessible.

Here, the transfer unit may transfer the recorded part of the content to the found recording medium after the unrecorded part of the content has been recorded in the found recording medium.

After an unrecorded part of a content being recorded has been recorded in a substitute recording medium, a recorded part of the content, which has already been recorded in a recording medium in which the content has been originally recorded, is transferred to the substitute recording medium. Accordingly, it is unnecessary to transfer the recorded part while the unrecorded part is recorded in the substitute recording medium. Also, even when the content is recorded at a high bit rate, it is possible to allocate a bandwidth for recording the content.

Here, the recording device may further comprise an edition unit operable to edit the content so as to integrate the recorded part of the content transferred by the transferring unit and a part of the content recorded in the found recording medium after the recording destination has been changed.

A recorded part of a content transferred by the transfer unit and a part of the content recorded in a substitute recording medium after change of a recording destination of the content are integrated. Accordingly, it is possible to play back, as a series of one content, the parts of the content that are separately recorded in a single recording medium.

Here, the edition unit may integrate the parts of the content by generating a file in which the recorded part transferred to the found recording medium and the part recorded in the found recording medium are concatenated with each other.

A file is generated in which a transferred recorded part of a content and a part of the content recorded in a substitute recording medium after change of a recording destination of the content are concatenated with each other. Accordingly, it is possible to treat one content as one file, and therefore users can easily perform manual management and edition of the content.

Here, the edition unit may integrate the parts of the content by generating a playlist showing that the recorded part transferred to the found recording medium and the part recorded in the found recording medium are continuous.

A playlist showing that a transferred recorded part of a content and a part of the content recorded in a substitute recording medium after change of a recording destination of the content are continuous. Accordingly, even when one content is recorded as an aggregation of a plurality of files in a recording medium, it is possible to play back the content as a series of one content in accordance with the playlist.

Here, the recording device may further comprise a transfer permission unit operable, when the change unit changes the recording destination, to determine whether to permit transfer of the recorded part to the found recording medium.

When the change unit changes a recording destination of a content, whether to permit to transfer a recorded part of the content is determined for each recording medium. Accordingly, as is conventionally performed, it is possible to record the content in recording media each having a free space in order, and not to transfer the recorded part to any substitute recording medium.

Here, the search unit may search, among only recording media to which transfer of the recorded part is permitted by the transfer permission unit, for the recording medium having the free space whose size is larger than the sum.

The search unit searches, among only recording media to which transfer of the recorded part is permitted by the transfer permission unit, for the recording medium having the free space whose size is larger than the sum.

Among only recording media to which transfer of a recorded part of a content is permitted, the searching unit searches for a substitute recording medium. Accordingly, it is possible to efficiently perform searching for the substitute recording medium, without acquiring unnecessary information such as a size of a free space of a recording medium on which transfer processing is not permitted.

Here, if the search unit fails to find the recording medium that satisfies the predetermined condition, the unrecorded part of the content may be recorded in a free space of another recording medium.

When the search unit fails to find a substitute recording medium that satisfies the predetermined condition, the content is recorded in a free space of any of recording media that are searched. Accordingly, even when a recording medium having a free space whose size is larger than a size of a free space of a recording medium in which a content is being recorded is unavailable, it is possible to record an unrecorded part of the content in a free space of any of the recording media.

Here, the recording device may further comprise a reading/writing unit operable to read/write the content from/into the found recording medium changed to be the recording destination by the change unit, wherein the reading/writing unit may have a function for converting a data format of the content depending on a type of the recording medium, and a function for managing data alignment in the recording medium.

The reading/writing unit has a function for converting a data format of a content depending a type of a recording medium in which the content is to be recorded. Accordingly, it is possible, for example, to convert a data format of a content from the MPEG-TS format to the MPEG-PS format, and then write the content in a recording medium. Also, the reading/writing unit has a function for managing data alignment in a recording medium, and supports various file systems different between the recording media. Accordingly, it is possible to manage and edit content files. When transfer of a recorded part of a content that is being recorded has completed, it is possible to record an unrecorded part of the content by adding the unrecorded part to a file corresponding to the transferred recorded part.

DESCRIPTION OF CHARACTERS

110: tuner
111: encoder
120: operation input unit
210: recording control unit
220: search unit
230: transfer unit
240: edition unit
300: file system unit

DETAILED DESCRIPTION OF THE INVENTION

First Embodiment

Structure

Figure 1:
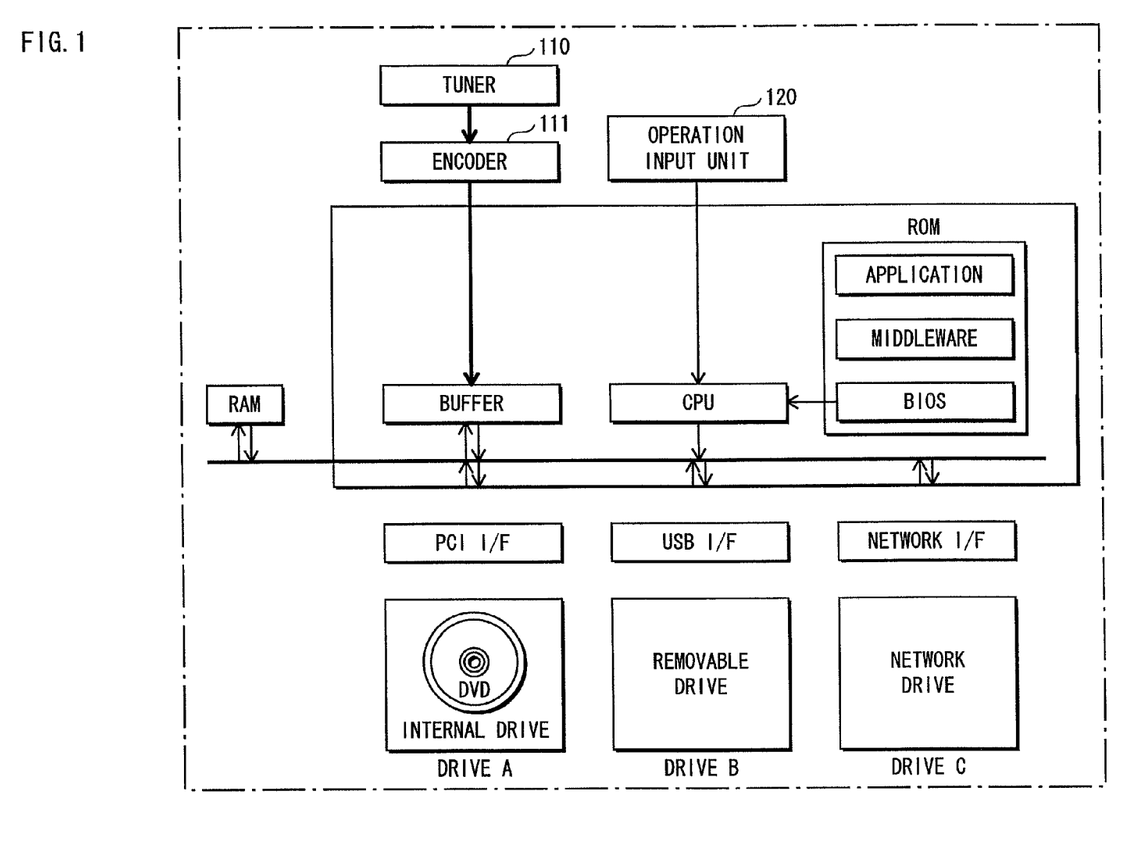
FIG. 1 is a block diagram showing the hardware structure of a recording device according to a first embodiment of the present invention.

A recording device according to a first embodiment of the present invention has the hardware structure shown in FIG. 1.

As shown in FIG. 1, the recording device starts recording in accordance with a user's instruction input via an operation input unit 120. The recording device encodes data of contents received from a tuner 110 using an encoder 111, and stores the encoded data in a buffer included therein. When the buffer becomes full, the recording device writes the encoded data stored in the buffer into a recording medium.

The tuner 110 receives video signals and audio signals. The tuner 110 may have a function for receiving broadcast signals, or alternatively may have a function for receiving contents such as video information and audio information via the Internet.

The recording device includes therein a plurality of drives used for recording media. A drive is a unit for the recording device to recognize a recording medium. The drives include, for example, an internal drive that is built in the recording device, a removable drive that is removable by a user at any time, and a network drive that is accessible via a network. FIG. 1 shows an example where the recording device includes therein not only a DVD drive as an internal drive but also a removable drive such as an external hard disk via an USB interface and a network drive via a network interface. The recording device mounts thereon these drives for the recording media so as to freely read/write contents from/into the drives. The recording device stores applications and middleware for performing recording processing in a ROM included therein, and causes a CPU to perform the recording processing.

Figure 2:
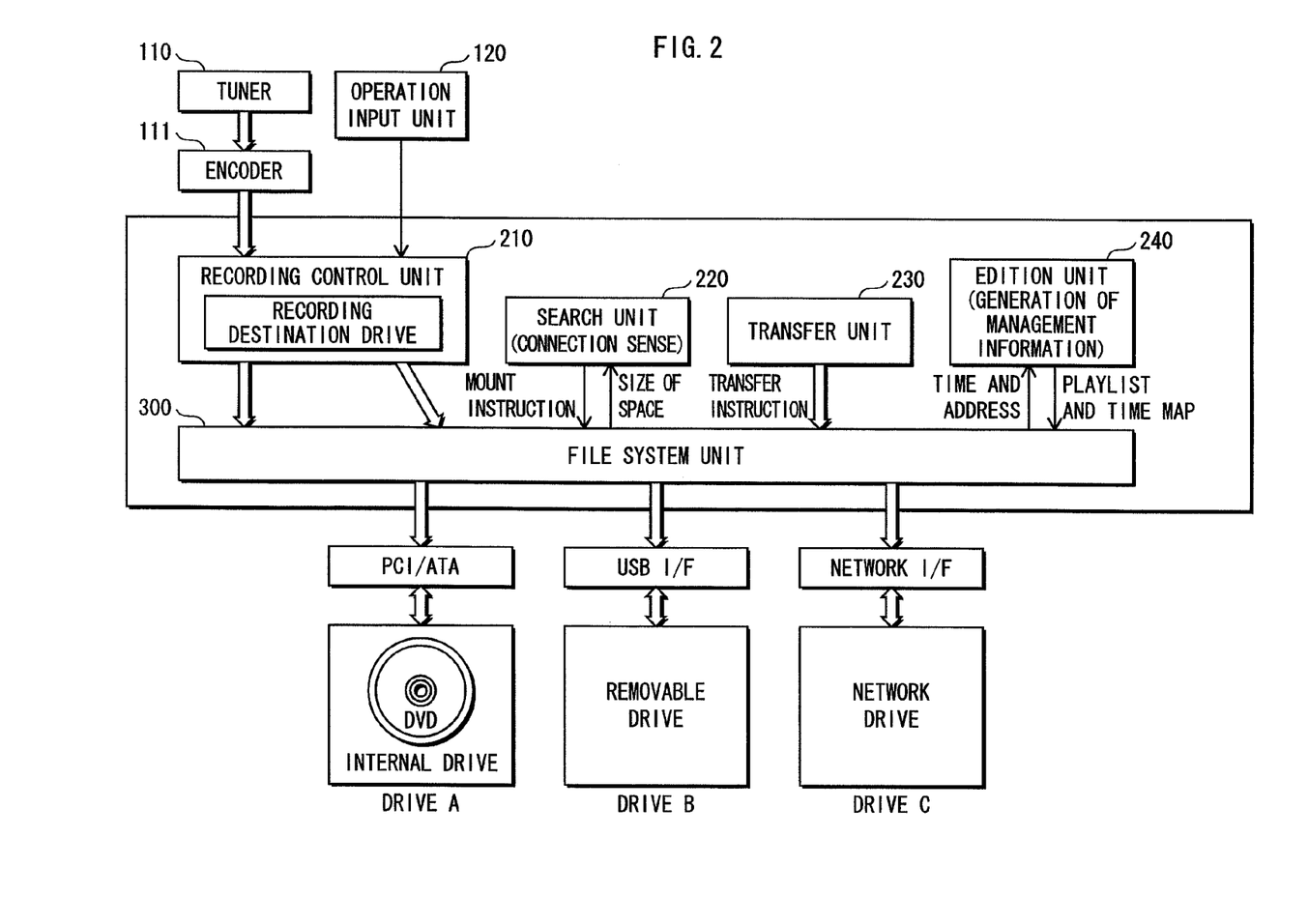
FIG. 2 is a block diagram showing the functional structure of the recording device according to the first embodiment of the present invention.

FIG. 2 shows functional components of the recording device. The recording device includes therein a recording control unit 210, a search unit 220, a transfer unit 230, an edition unit 240, and a file system unit 300.

The recording control unit 210 performs recording processing for writing data of a content encoded by the encoder 111 into a recording medium, in accordance with a user's instruction input via the operation input unit 120. The recording control unit 210 stores therein, as a substitute recording destination, a recording medium found by the search unit 220, and writes a content into the found recording medium. When completing writing the content, the recording control unit 210 notifies the edition unit 240 of completion of writing of the content.

The search unit 220 searches for a recording medium capable of recording a content for as long as possible among all recording media accessible to the recording device. The search unit 220 detects a size of a free space of each of the recording media, and searches for a recording medium having a free space whose size is larger than a sum of a size of a free space of a recording medium in which the content is being recorded and a size of a recorded part of the content. If it is unknown when recording stops like a case of real-time recording, the search unit 220 selects, as a next recording destination of the content, a drive having a free space whose size is largest among the searched drives, in order to record the content for as long as possible. Also, if a size of a content to be recorded is known beforehand like a case of a timer recording, the search unit 220 may select, as a next recording destination of the content, a drive having a sufficient free space required for recording all parts of the content. While the content is recorded, the search unit 220 acquires information such as a size of a free space of each of the recording media at predetermined time intervals, for example every one minute. Accordingly, even when the drive structure changes while a content is recorded, like a case of an USB-connected external hard disk and a hard disk on a network, it is possible to detect the change of the drive structure in real time, and search for the most appropriate recording medium as a next recording destination of the content.

When a recording destination of a content being recorded is changed from a recording medium to a substitute recording medium, the transfer unit 230 transfers, to the substitute recording medium, a recorded part of the content, which has already been recorded in the recording medium before the change of the recording destination. The transfer unit 230 may perform this transfer processing at the same time as when or after an unrecorded part of the content is recorded in the substitute recording medium. When completing the transfer processing, the transfer unit 230 notifies the edition unit 240 of completion of the transfer processing in order to integrate the parts of the content that have been separately recorded in the substitute recording medium.

When a recording destination of a content being recorded is changed from a recording medium to a substitute recording medium, a part of the content recorded in the substitute recording medium by the recording control unit 210 after the change of the recording destination and a transferred recorded part of the content, which has already been recorded in the recording medium and transferred to the substitute recording medium, are separately saved in one drive. The edition unit 240 integrates these parts of the content. The edition unit 240 performs this integration processing after receiving both of a recording completion notification transmitted by the recording control unit 210 and a transfer completion notification transmitted by the transfer unit 230. The edition unit 240 may perform this integration processing by integrating two content files respectively corresponding to the parts of the content to generate one content file or by editing a playlist so as to play back the two content files in series.

The file system unit 300 mounts a file system of a recording medium, and performs writing and reading. In accordance with a writing instruction issued by the recording control unit 210, the file system unit 300 generates a stream file and a time map of a content in the file system. Also, in accordance with a mount instruction issued by the search unit 220, the file system unit 300 mounts the file system, and acquires information such as a size of a free space of the recording medium. Furthermore, in accordance with a transfer instruction issued by the transfer unit 230, the file system unit 300 moves files on the file system. The file system unit 300 acquires a time and address information from the time map, and transmits the acquired time and address information to the edition unit 240, and writes a playlist generated by the edition unit 240 into the file system.

With the above structure, it is possible to automatically record one content in a single drive for as long as possible via no manual operation of a user, without recording parts of the content separately in a plurality of drives and without deleting contents that have ever been recorded. Furthermore, a part of a content recorded in a recording medium before change of a recording destination of the content and transferred to a substitute recording medium and a part of the content subsequently recorded in the substitute recording medium after the change of the recording destination are integrated via edition processing. Accordingly, a discontinuity does not occur in a stream of the content, and therefore playback is performed without interruption.

In the above description, the search unit searches for the most appropriate recording medium among all recording media accessible to the recording device. However, the recording device may include therein a transfer permission unit for causing a user to determine beforehand whether to permit transfer processing on each of the recording media, and the search unit may search for the most appropriate recording medium among only recording media on which transfer processing is permitted. Accordingly, the following processing can be also employed, as is conventionally employed. When a free space of an original recording medium in which a content is being recorded runs out, an unrecorded part of the content is recorded in a substitute recording medium, and a part of the content in the original recording medium is not transferred to the substitute recording medium.

<Use Case>

The following describes how a content whose size is unknown is actually recorded in a recording medium by the recording device of the present invention, with reference to FIG. 3. Here, two recording media A and B having the same size space are used for simplicity of the description. In FIG. 3, the recording media A and B are represented as rectangle shapes. When a content is written into each of the recording media A and B, a size of the written content increases from left to right. Each of dashed dotted lines within the rectangle shapes represents a recording limit of the recording medium. When a content is written beyond this recording limit, a remaining free space of the recording medium is little.

Figure 3A:
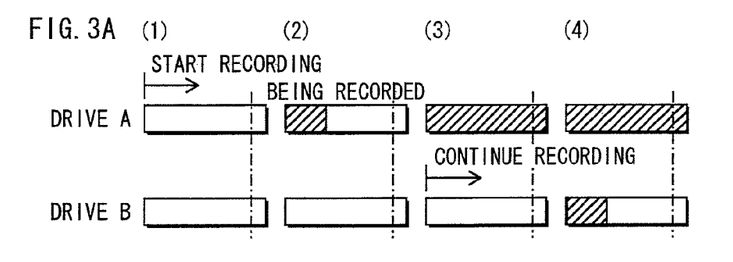
FIG. 3 shows how recording media are used in the recording device according to the first embodiment of the present invention.

FIG. 3A shows recording processing in a case where two recording media A and B respectively have an empty space. In Step (1), when the recording processing starts, the recording device starts writing a content into the recording medium A. In Step (2), until the recording medium A reaches its recording limit, the recording device continues to write the content into the recording medium A. When the recording medium A reaches the recording limit, a sum of a size of a recorded part of the content, which has already been recorded in the recording medium A, and a remaining free space of the recording medium A is equal to a size of a free space of the recording medium B. Accordingly, the recording device does not change a recording destination of the content from the recording medium A to the recording medium B. In Step (3), if the recording device does not stop recording the content in the recording medium A even after the free space of the recording medium A has run out, the recording device subsequently starts recording the content in a free space of the recording medium B. In Step (4), the recording device stops recording the content in the recording medium B before the free space of the recording medium B has run out. As a result, the recording device records the content in the recording medium A for as long as possible, and records, in the recording medium B, a remaining unrecorded part of the content that has not been recorded in the recording medium A.

Figure 3B:
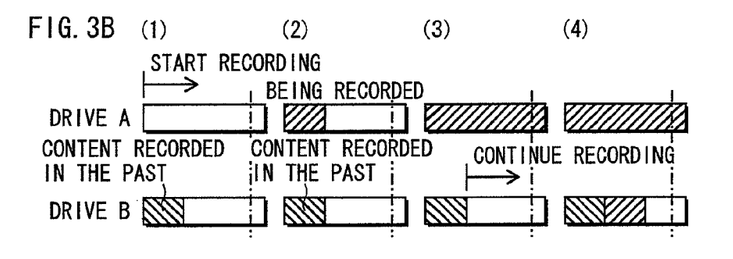

FIG. 3B shows recording processing in the following case. At a time when recording processing starts, only the recording medium A has an empty space, and is accessible to the recording device. After the recording processing starts, the recording medium B in which a content has ever been recorded is connected to the recording device. In Step (1), when the recording processing starts, the recording device starts writing a content into the recording medium A. In Step (2), until the recording medium A reaches its recording limit, the recording device continues to write the content into the recording medium A. When the recording medium A reaches the recording limit, a sum of a size of a recorded part of the content, which has already been recorded in the recording medium A, and a size of a remaining free space of the recording medium A is larger than a size of a free space of the recording medium B. Accordingly, the recording device does not change a recording destination of the content from the recording medium A to the recording medium B. In Step (3), if the recording device does not stop recording the content in the recording medium A even after the free space of the recording medium A has run out, the recording device subsequently starts recording the content in the free space of the recording medium B. In Step (4), the recording device stops recording the content in the recording medium B before the free space of the recording medium B has run out. Accordingly, the recording device records the content in the recording medium A for as long as possible, and records, in the recording medium B, a remaining unrecorded part of the content that has not been recorded in the recording medium A, together with the content that has ever been recorded in the recording medium B.

Figure 3C:
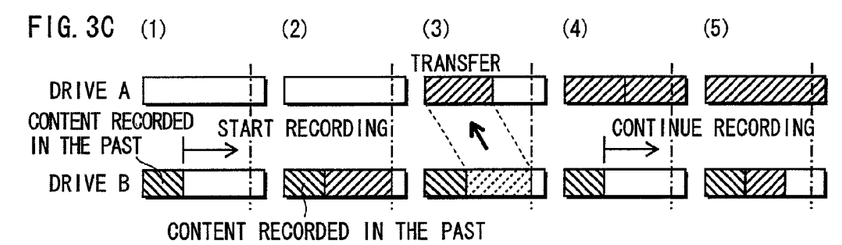

FIG. 3C shows recording processing in the following case. At a time when recording processing starts, only the recording medium B in which a content has ever been recorded is accessible to the recording device. After the recording processing starts, the recording medium A having an empty space is connected to the recording device. In Step (1), when the recording processing starts, the recording device starts writing a content into a free space of the recording medium B. In Step (2), until the recording medium B reaches its recording limit, the recording device continues to write the content into the recording medium B. In Step (3), when the recording medium B reaches the recording limit, a sum of a size of a recorded part of the content being recorded, which has already been recorded in the recording medium B, and a size of a remaining free space of the recording medium B is smaller than a size of a free space of the recording medium A. Accordingly, the recording device changes a recording destination of the content from the recording medium B to the recording medium A. Along with this change of the recording destination, the recording device transfers the recorded part to the recording medium A. The recording device subsequently starts recording the content in the recording medium A. The recording device continues to record the content in the recording medium A. When the recording medium A reaches its recording limit, a sum of a size of the transferred recorded part, a size of the part of the content recorded in the recording medium A after the transfer, and a size of the free space of the recording medium A is larger than a size of a free space of the recording medium B. Accordingly, the recording device does not change the recording destination from the recording medium A to the recording medium B. In Step (4), when the recording device does not stop recording the content in the recording medium A even after the free space of the recording medium A has run out, the recording device subsequently starts recording the content in the free space of the recording medium B. In Step (5), the recording device stops recording the content in the recording medium B before the free space of the recording medium B has run out. As a result, the recording device records the content in the recording medium A for as long as possible, and records, in the recording medium B, a remaining unrecorded part of the content that has not been recorded in the recording medium A, together with the content that has ever been recorded in the recording medium B.

Figure 3D:
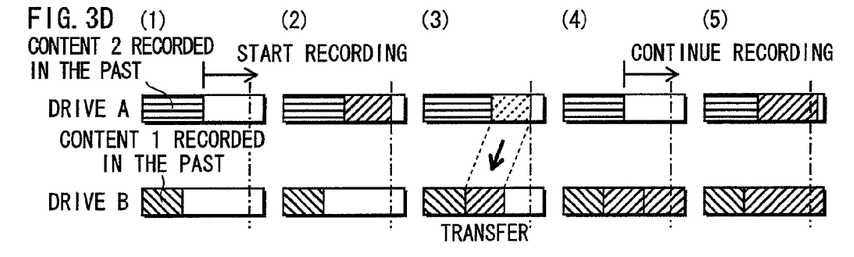

FIG. 3D shows recording processing in the following case. At a time when recording processing starts, only the recording medium A in which a content 2 has ever been recorded is accessible to the recording device. After the recording processing starts, the recording medium B in which a content 1 has ever been recorded is connected to the recording device. A size of the recorded content 1 is smaller than a size of the recorded content 2. In Step (1), when the recording processing starts, the recording device starts writing a content into a free space of the recording medium A. In Step (2), until the recording medium A reaches its recording limit, the recording device continues to write the content into the recording medium A. In Step (3), when the recording medium A reaches the recording limit, a sum of a size of a recorded part of the content being recorded, which has already been recorded in the recording medium A and a size of a remaining free space of the recording medium A is smaller than a size of a free space of the recording medium B. Accordingly, the recording device changes a recording destination of the content from the recording medium A to the recording medium B. Along with this change of the recording destination, the recording device transfers the recorded part to the recording medium B. The recording device subsequently starts recording the content in the recording medium B. The recording device continues to record the content in the recording medium B. When the recording medium B reaches its recording limit, a sum of a size of the transferred recorded part of the content, a size of the part of the content recorded in the recording medium B after the transfer, and a size of the free space of the recording medium B is larger than a size of the free space of the recording medium A. Accordingly, the recording device does not change the recording destination from the recording medium B to the recording medium A. In Step (4), when the recording device does not stop recording the content in the recording medium B even after the free space of the recording medium B has run out, the recording device subsequently starts recording the content in a free space of the recording medium A. The recording device continues to record the content in the recording medium A. When the recording medium A reaches the recording limit again, the free space of the recording medium B has already run out. Accordingly, the recording device does not change the recording destination from the recording medium A to the recording medium B. In Step (5), the recording device stops recording the content in the recording medium A before the free space of the recording medium A has run out. As a result, the recording device records the content in the recording medium B for as long as possible, and records, in the recording medium A, a remaining unrecorded part of the content that has not been recorded in the recording medium B, together with the content that has ever been recorded in the recording medium A.

Figure 3E:
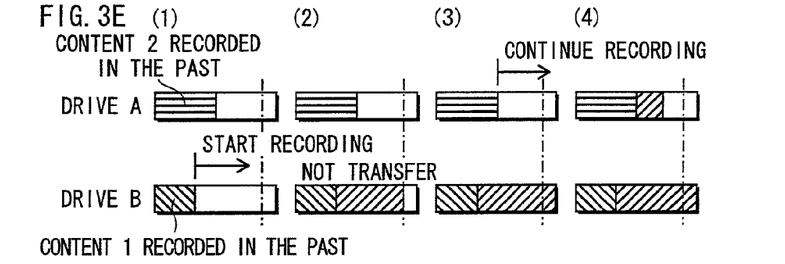

FIG. 3E shows recording processing in the following case. At a time when recording processing starts, only the recording medium B in which a content 1 has ever been recorded is accessible to the recording device. After the recording processing starts, the recording medium A in which a content 2 has ever been recorded is connected to the recording device. A size of the recorded content 1 is smaller than a size of the recorded content 2. In Step (1), when the recording processing starts, the recording device starts writing a content into a free space of the recording medium B. Until the recording medium B reaches its recording limit, the recording device continues to write the content into the recording medium B. In Step (2), when the recording medium B reaches the recording limit, a sum of a size of a recorded part of the content being recorded, which has already been recorded in the recording medium B, and a size of the free space of the recording medium B is larger than a size of a free space of the recording medium A. Accordingly, the recording device does not change a recording destination of the content from the recording medium B to the recording medium A. In Step (3), when the recording device does not stop recording the content in the recording medium B even after the free space of the recording medium B has run out, the recording device subsequently starts recording the content in the free space of the recording medium A. The recording device continues to record the content in the recording medium A. When the recording medium A reaches the recording limit again, the free space of the recording medium B has already run out. Accordingly, the recording device does not change the recording destination from the recording medium A to the recording medium B. In Step (4), the recording device stops recording the content in the recording medium A before the free space of the recording medium A has run out. As a result, the recording device records the content in the recording medium B for as long as possible, and records, in the recording medium A, a remaining unrecorded part of the content that has not been recorded in the recording medium B, together with the content that has ever been recorded in the recording medium A.

<Condition for Changing Recording Destination>

Figure 4:
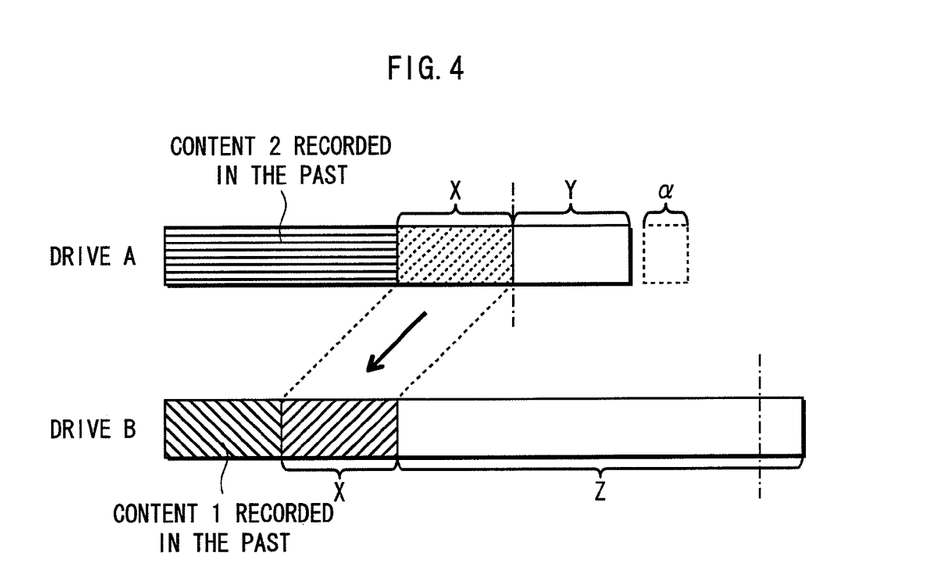
FIG. 4 shows a condition for changing a recording destination used in the recording device according to the first embodiment of the present invention.

The following describes a condition for changing a recording medium that is a recording destination with reference to FIG. 4.

Here, two recording media are used. One is a recording medium A in which a content 2 has ever been recorded. The other is a recording medium B in which a content 1 has ever been recorded. The recording medium A has a space whose size is smaller than a size of a space of the recording medium B. The recorded content 1 has a size smaller than a size of the content 2.

FIG. 4 shows a use status of the recording media A and B in a case where recording of a content starts from the recording medium A and the recording medium A reaches its recording limit. In FIG. 4, a size of a recorded part of the content being recorded, which has already been recorded in the recording medium A, is represented as X. A size of a free space of the recording medium A is represented as Y. When the recorded part of the content is transferred from the recording medium A to the recording medium B, a size of a free space of the recording medium B is represented as Z.

A recording destination of the content is changed from the recording medium A to the recording medium B if the following condition expression is satisfied: $(X+Z)>(X+Y)$, that is, $Z>Y$. In other words, if a sum of X representing the size of the part recorded in the recording medium A and Y representing the size of the free space of the recording medium A is smaller than $(X+Z)$ representing the size of the free space of the recording medium B before X has been transferred, the recording destination is changed.

However, in fact, when the recording destination is changed, in order to transfer the recorded part and record the content in a recording medium after the change of the recording destination without failing to record any part of the content, access preparation needs to be performed by performing spin-up of the recording medium B that is to be a next recording destination after the change of the recording destination. A time period required for this access preparation is represented as α. If Z>(Y+α) is satisfied, the recording destination of the content may be changed.

<Edition Processing>

If the above condition for changing a recording destination of a content is satisfied, the recording destination is changed from an original recording medium to a substitute recording medium, and a recorded part of the content, which has already been recorded in the original recording medium, is transferred to the substitute recording medium. An unrecorded part of the content, which has not yet been recorded in the original recording medium, is subsequently recorded in the substitute recording medium. Accordingly, when transfer of the recorded part and recording of the unrecorded part after the change has completed, the transferred recorded part and the part recorded after the change are separately saved in a single recording medium. The following describes a method for editing a playlist performed by the edition unit 240 so as to play back these separately recorded parts of the content as a series of the content, with reference to FIG. 5.

Figure 5:
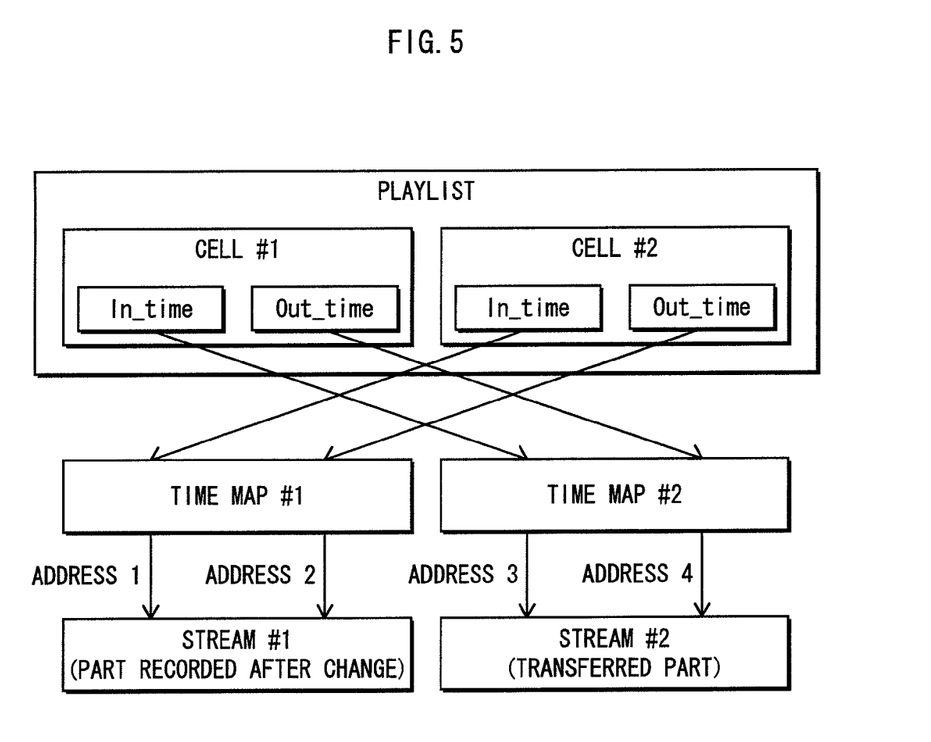
FIG. 5 shows a content edition method used in the recording device according to the first embodiment of the present invention.

FIG. 5 shows a method for editing a playlist.

The transferred recorded part and the part recorded after the change are separately saved in a single recording medium, and respectively have a stream that is a sequence of GOP and a time map in which an address of the GOP is stored. In FIG. 5, the part recorded after the change is saved in a stream #1, and the transferred recorded part is saved in a stream #2. The playlist is an array of cells in which the addresses respectively correspond to start points "In_Time" and end points "Out_Time". FIG. 5 shows an example where a playlist includes a cell #1 and a cell #2. A start point "In_Time" of the cell #1 is set at an address 3 of the stream #2. An end point "Out_Time" of the cell #1 is set at an address 4 of the stream #2. A start point "In_Time" of the cell #2 is set at an address 1 of the stream #1. An end point "Out_Time" of the cell #2 is set at an address 2 of the stream #1. Accordingly, by playing back the cell #1 and the cell #2 in order in accordance with the playlist, it is possible to play back all parts of the content as a series of the content.

<Operations of Recording Processing>

Figure 6:
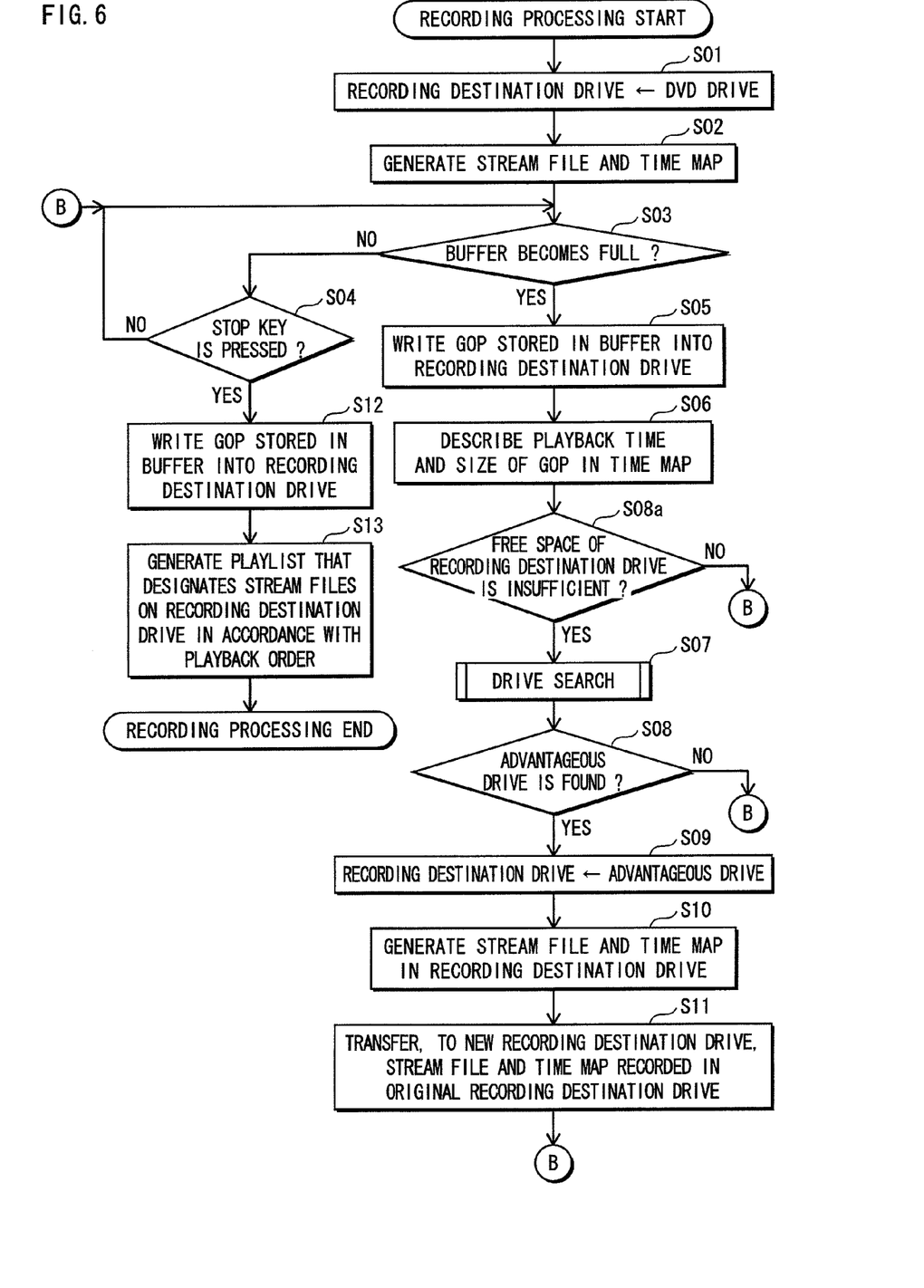
FIG. 6 is a flow chart showing operations of recording processing performed in the recording device according to the first embodiment of the present invention.

The following describes processing of recording contents with reference to a flow chart shown in FIG. 6. FIG. 6 shows an example flow chart of operations of recording processing performed by the recording device according to the first embodiment of the present invention. Here, the recording device includes therein only a DVD drive as an internal drive. Other drives are removable via the USB interface or the network by a user.

Firstly, the operation input unit 120 issues a recording start instruction input by the user. When recording operation starts, the recording control unit 210 sets, as an original recording destination of a content, the DVD drive included in the recording device (Step S01). This recording operation may start not only by issuing a recording start instruction in real time, but also by setting beforehand to issue a recording start instruction for a timer recording, for example.

Then, the file system unit 300 generates a stream file and a time map on the recording medium as the recording destination (Step S02).

The recording control unit 210 monitors whether a buffer becomes full (Step S03). If the buffer does not become full (Step S03: NO), the recording control unit 210 continues to store GOP in the buffer until a recording stop key included in the recording device has been pressed (Step S04). If the buffer becomes full (Step S03: YES), the recording control unit 210 writes, into the original recording medium as the recording destination, the GOP stored in the buffer (Step S05). Next, the recording control unit 210 describes a playback time and a size of the GOP (Step S06).

Here, if the original recording medium in which the content is being recorded has a sufficient free space (Step S08*a*: NO), the flow returns to Step S03 for storing GOP. If the original recording medium in which the content is being recorded does not have a sufficient free space (Step S08*a*: YES), the search unit 220 searches for the most advantageous recording medium as a substitute recording destination among recording media accessible to the recording device at this time (Step S07). This is performed in order to record the content in a single recording medium for as long as possible. If the most advantageous recording medium is found as a result of the drive search (Step S08: YES), the search unit 220 changes the recording destination from the original recording medium to the found recording medium (Step S09).

Since the recording destination is changed, the file system unit 300 generates a stream file and a time map on the found substitute recording medium that is the new recording destination (Step S10). Then, the transfer unit 230 transfers, to the substitute recording medium, the stream file and the time map that have already been recorded in the original recording medium (Step S11). At this time, since the bandwidth is decreased due to the transfer of the stream file and the time map, the bit rate for recording processing needs to be decreased depending on the bandwidth decrease. If the decrease of the bit rate causes any trouble, the transfer performed in Step S11 may be performed after completion of the recording processing. Then, the flow returns to Step S03 for storing GOP.

If the recording stop key is pressed (Step S04: YES) before the buffer becomes full (Step S03: NO), the recording control unit 210 writes the GOP stored in the buffer into the original recording medium (Step S12), and generates a playlist that designates stream files on the recording medium in accordance with their playback order (Step S13). Then, the recording processing ends.

In the above recording processing, only when a size of a free space of an original recording medium in which a content is being recorded becomes insufficient, the search unit 220 performs drive search. Instead of this, whenever the buffer becomes full, the search unit 220 may perform drive search irrespective of whether the free space of the original recording medium is sufficient. Also, the following may be employed. After an advantageous drive is found as a result of drive search, whether an original recording medium in which a content is being recorded has a sufficient free space is judged. Only if judged that the free space of the original recording medium is insufficient, the recording destination is changed from the original recording medium to the found advantageous recording medium.

<Operations of Drive Search>

Figure 7:
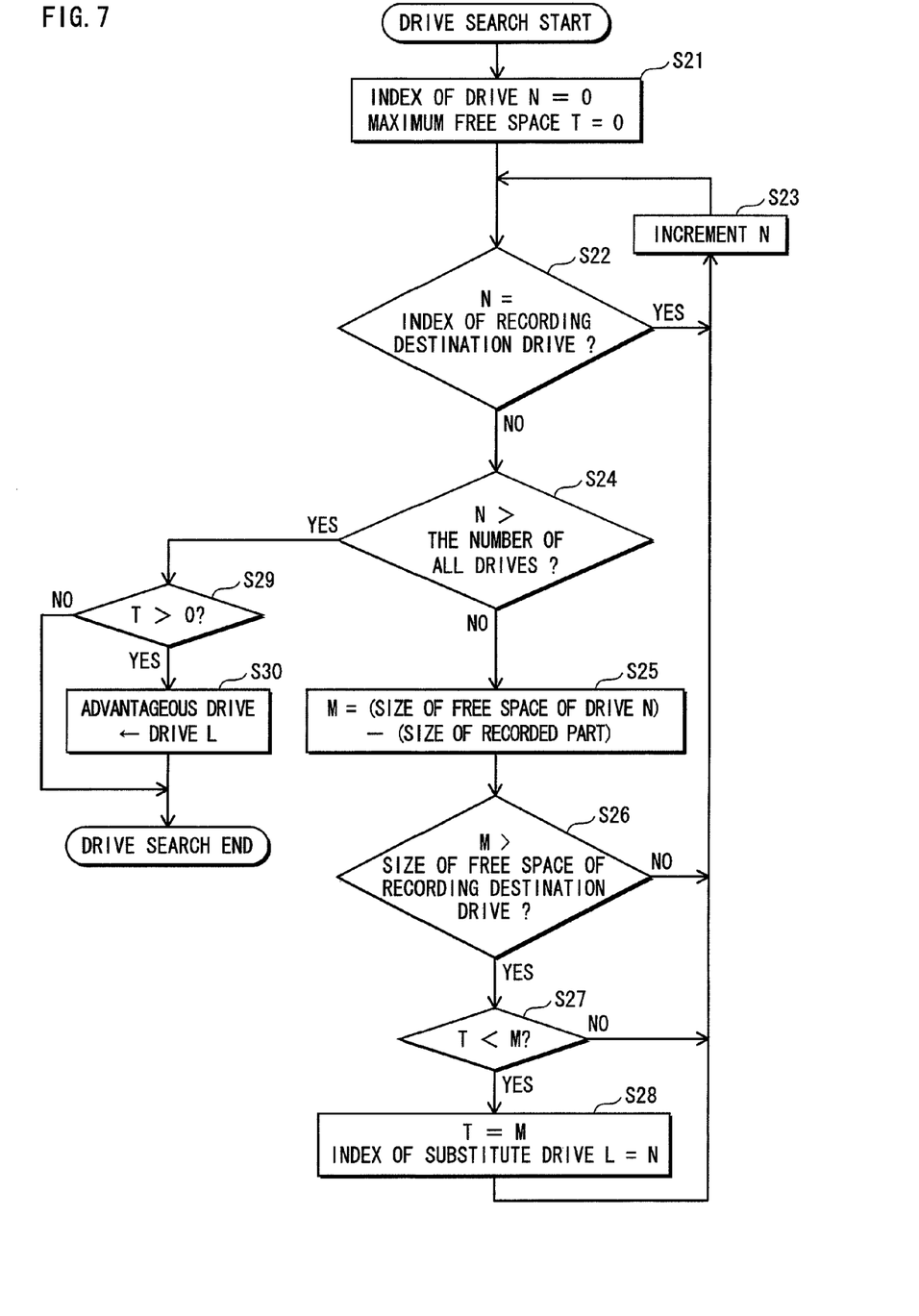
FIG. 7 is a flow chart showing operations of drive search performed in the recording device according to the first embodiment of the present invention.

The following describes operations of drive search in the recording processing performed by the recording device according to the first embodiment of the present invention, with reference to a flow chart shown in FIG. 7. Drive search is performed in the following case. While the recording device records a content in an original recording medium, if other drives such as a removable drive and a network drive become accessible to the recording device, the recording device searches, among these accessible drives, for the most advantageous drive for recording the content being recorded in order to record the content in a single recording medium for as long as possible. Here, in consideration of a case where a size of a content being recorded is unknown, the most advantageous drive is defined as a drive that has the largest free space among drives accessible to the recording device even after to which a recorded part of the content has been transferred.

FIG. 7 shows an example flow chart showing operations of drive search performed by the recording device according to the first embodiment of the present invention.

As the initial status, an index N of an original recording medium is set to be "0" and a size of a free space T of an original recording medium is set to be "0" (Step S21). The search unit 220 performs the following processing on all accessible drives (Step S24) other than the original recording medium that is a recording destination of a content being recorded (Step S22). That is, when a recorded part of the content is transferred and the recording destination is changed from the original recording medium to another recording medium, the recording device judges whether it is appropriate to change the recording destination in order to record the content in a single recording medium for as long as possible.

Specifically, when the search unit 200 issues a mount instruction to a drive for the recording medium N, the file system unit 300 detects a size of a free space of the recording medium N. The file system unit 300 compares a difference M (Step S25) between a size of a free space of the recording medium N and a size of a recorded part of a content being recorded that has already been recorded in an original recording medium with a size of a free space of the original recording medium in which the content is being recorded (Step S26). If the size of the free space M is no more than the free space T (Step S26: NO), the search unit 220 increments N (Step S23), and then performs the above comparison with respect to another recording media. If the free space M is greater than the free space T (Step S26: YES), the search unit 220 compares the free space M and the free space T (Step S27). If the free space T is no less than the free space M (Step S27: NO), the search unit 220 increments N, and then performs the above comparison with respect to another recording media. If the free space T is less than the free space M (Step S27: YES), the search unit 220 assigns M to T, and assigns N to an index L of a candidate for a substitute recording medium (Step S28). The search unit 220 performs this processing with respect to the all recording media. After candidates for the substitute recording medium each capable of recording the content for as long as possible or recording all parts of the content have been determined, the recording device can select one recording medium capable of recording the content for the longest time period among the candidates, while transferring, to the selected recording medium, the recorded part of the content that has already been recorded in the original recording medium.

If the candidates for the substitute recording medium are determined (Step S29: YES), the search unit 220 sets the recording medium L as the most advantageous recording medium (Step S30), and the drive searching ends. If the candidates for the substitute recording medium are not determined (Step S29: NO), the drive searching ends.

In this way, it is possible to select, among recording media each capable of recording all parts of the content or recording the content for as long as possible, a recording medium capable of recording the content for the longest time period.

Second Embodiment

The first embodiment has been described based on the assumption that a size of a content to be recorded is unknown. However, if a size of a content to be recorded is known beforehand, for example, if a user makes a timer recording by designating a recording time period, it is possible to select a drive capable of more efficiently recording the content by performing the above drive search.

In other words, in the first embodiment, the most advantageous drive is described as a drive for a recording medium having a free space whose size is largest among recording media each having a free space whose size is larger than a size of a free space of an original recording medium in which a content is being recorded even after to which a recorded part of the content being recorded is transferred. However, if a size of a content to be recorded is known beforehand, a drive for a recording medium having a minimum size of a free space required for recording all parts of the content may be used as the most advantageous drive. In other words, among recording media each having a free space whose size is larger than a size of a free space of an original recording medium in which a content is being recorded even after to which a recorded part of the content is transferred, a drive for a recording medium having a free space whose size is smallest is selected as the most advantageous drive. Accordingly, it is possible to keep larger free spaces in order to record another content having a lager size.

In the flow chart shown in FIG. 7, the maximum free space is initialized such that T=0 is satisfied (Step S21). If the drive N that satisfies T<M is found (Step S27: YES), the maximum free space is updated such that T=M is satisfied, and an index drive for a substitute drive is updated such that L=N is satisfied (Step S28). If T is changed (Step S29: YES), the drive L is determined as the most advantageous recording medium (Step S30). Instead of performing these Steps, the following processing may be performed so as to keep larger free spaces in order to record another content having a larger size, as described above. The minimum free space T' is initialized to be a sufficient free space. If a drive N that satisfies T>M and M>0 is found, the minimum free space T' is updated such that T'=M is satisfied. If T' is changed, the drive L is determined as the most advantageous recording medium.

INDUSTRIAL APPLICABILITY

With the recording device according to the present invention, when contents are recorded in a plurality of recording media, a recording medium for recording the content is automatically selected such that the content is recorded in a single recording medium for as long as possible. Even when a free space of an original recording medium that is a recording destination of a content runs out during recording of the content, a substitute recording medium that has newly become accessible to the recording device is detected in realtime. A recorded part of the content that has been recorded in the original recording medium is transferred to the substitute recording medium, and the transferred recorded part and a part of the content that has been subsequently recorded in the substitute recording medium after change of the recording destination from the original recording medium to the substitute recording medium are integrated. Accordingly, it is possible to record one content in a single recording medium for as long as possible without a user's manual operations.

The invention claimed is:

1. A recording device that records contents in recording media, the recording device comprising:
a search unit operable, in a state where only a part of a content has been recorded in a recording medium, (i) to acquire a size of a free space of the recording medium in which the content is being recorded, and (ii) when the size of the free space of the recording medium in which the content is being recorded becomes a predetermined size or smaller, to search for another recording medium having a free space whose size is larger than a sum of the size of the free space of the recording medium in which the content is being recorded and a size of the recorded part of the content;

a change unit operable to change a recording destination of an unrecorded part of the content to the recording medium found by the search unit; and a transferring unit operable to transfer the recorded part to the found recording medium.

2. The recording device of claim 1,
wherein if the search unit finds a plurality of recording media each having a free space whose size is larger than the sum, the change unit changes the recording destination to a recording medium having a free space whose size is largest among the found recording media.

3. The recording device of claim 1,
wherein the content has a fixed time length,
wherein a total of a size of a free space required for recording the unrecorded part of the content and the size of the recorded part of the content is calculated based on the fixed time length, and
wherein the recording medium found by the search unit has a free space whose size is larger than the total.

4. The recording device of claim 3,
wherein if the search unit finds a plurality of recording media each having a free space whose size is larger than the total, the change unit changes the recording destination to a recording medium having a free space whose size is smallest among the found recording media.

5. The recording device of claim 1,
wherein the search unit performs the searching by (i) detecting, at a predetermined time interval, the size of the free space of the recording medium in which the content is being recorded and a size of a free space of each of a plurality of recording media accessible to the recording device, and (ii) performing a comparison using the sizes.

6. The recording device of claim 1,
wherein the transfer unit transfers the recorded part of the content to the found recording medium after the unrecorded part of the content has been recorded in the found recording medium.

7. The recording device of claim 1, further comprising
an edition unit operable to edit the content so as to integrate the recorded part of the content transferred by the transferring unit and a part of the content recorded in the found recording medium after the recording destination has been changed.

8. The recording device of claim 7,
wherein the edition unit integrates the parts of the content by generating a file in which the recorded part transferred to the found recording medium and the part recorded in the found recording medium are concatenated with each other.

9. The recording device of claim 7,
wherein the edition unit integrates the parts of the content by generating a playlist showing that the recorded part transferred to the found recording medium and the part recorded in the found recording medium are continuous.

10. The recording device of claim 1, further comprising
a transfer permission unit operable, when the change unit changes the recording destination, to determine whether to permit transfer of the recorded part to the found recording medium.

11. The recording device of claim 10,
wherein the search unit searches, among only recording media to which transfer of the recorded part is permitted by the transfer permission unit, for the recording medium having the free space whose size is larger than the sum.

12. The recording device of claim 1,
wherein if the search unit fails to find the recording medium having the free space whose size is larger than the sum, the unrecorded part of the content is recorded in a free space of a third recording medium.

13. The recording device of claim 1, further comprising
a reading/writing unit operable to read/write the content from/into the found recording medium changed to be the recording destination by the change unit,
wherein the reading/writing unit has a function for converting a data format of the content depending on a type of the found recording medium, and a function for managing data alignment in the found recording medium.

14. An integrated circuit for recording contents in recording media, the integrated circuit comprising:
a search unit operable, in a state where only a part of a content has been recorded in a recording medium, (i) to acquire a size of a free space of the recording medium in which the content is being recorded, and (ii) when the size of the free space of the recording medium in which the content is being recorded becomes a predetermined size or smaller, to search for another recording medium having a free space whose size is larger than a sum of the size of the free space of the recording medium in which the content is being recorded and a size of the recorded part of the content;
a change unit operable to change a recording destination of an unrecorded part of the content to the recording medium found by the search unit; and
a transferring unit operable to transfer the recorded part to the found recording medium.

15. A program embodied on a non-transitory computer readable recording for causing a computer to record contents in recording media, wherein, when executed, the program causes the computer to perform a method comprising:
a searching step of, in a state where only a part of a content has been recorded in a recording medium, (i) acquiring a size of a free space of the recording medium in which the content is being recorded, and (ii) when the size of the free space of the recording medium in which the content is being recorded becomes a predetermined size or smaller, searching for another recording medium having a free space whose size is larger than a sum of the size of the free space of the recording medium in which the content is being recorded and a size of the recorded part of the content;
a changing step of changing a recording destination of an unrecorded part of the content to the recording medium found by the search unit; and
a transferring step of transferring the recorded part to the found recording medium.

* * * * *